US012355307B1

(12) United States Patent
Kee et al.

(10) Patent No.: US 12,355,307 B1
(45) Date of Patent: Jul. 8, 2025

(54) GENERATOR WITH INTEGRATED SHIPPING FIXTURE

(71) Applicant: Schaeffler Technologies AG & Co. KG, Herzogenaurach (DE)

(72) Inventors: Noah Kee, Rittman, OH (US); Kolstin Hartzler, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/619,868

(22) Filed: Mar. 28, 2024

(51) Int. Cl.
*H02K 1/30* (2006.01)
*F02B 63/04* (2006.01)
*H02K 5/173* (2006.01)
*H02K 7/075* (2006.01)
*H02K 7/08* (2006.01)
*H02K 7/18* (2006.01)

(52) U.S. Cl.
CPC .............. *H02K 1/30* (2013.01); *F02B 63/042* (2013.01); *H02K 5/1735* (2013.01); *H02K 7/075* (2013.01); *H02K 7/085* (2013.01); *H02K 7/1815* (2013.01)

(58) Field of Classification Search
CPC ...... H02K 1/30; H02K 5/1735; H02K 7/1815; F02B 63/042
See application file for complete search history.

(56) References Cited

U.S. PATENT DOCUMENTS

| 4,262,224 | A  | * | 4/1981 | Kofink | H02K 5/203 310/90 |
| 4,337,406 | A  | * | 6/1982 | Binder | H02K 7/1815 403/287 |
| 8,120,198 | B2 | * | 2/2012 | Pabst | H02K 7/1838 290/55 |
| 11,215,533 | B2 | * | 1/2022 | Okamoto | G01L 3/22 |
| 11,708,789 | B2 | * | 7/2023 | Payne | B60K 6/26 290/1 A |
| 11,933,258 | B2 | * | 3/2024 | Ramsey | H02K 7/10 |
| 12,088,179 | B2 | * | 9/2024 | Heeke | H02K 7/003 |
| 2010/0019502 | A1 | * | 1/2010 | Pabst | F03D 80/50 290/55 |
| 2021/0048372 | A1 | * | 2/2021 | Okamoto | G01M 17/007 |
| 2022/0154675 | A1 | * | 5/2022 | Payne | F02N 11/04 |
| 2023/0114756 | A1 | * | 4/2023 | Payne | B60K 6/485 290/1 A |
| 2023/0231440 | A1 |   | 7/2023 | Ramsey et al. | |
| 2024/0018929 | A1 | * | 1/2024 | Ramsey | H02K 15/00 |

(Continued)

FOREIGN PATENT DOCUMENTS

| DE | 102014012348 A1 | 2/2016 | |
| DE | 112022004851 T5 * | 10/2024 | ............... B60K 1/00 |
| EP | 1895641 A2 | 3/2008 | |

(Continued)

*Primary Examiner* — Pedro J Cuevas

(57) ABSTRACT

A generator module includes a housing arranged for fixing to a combustion engine, a stator fixed in the housing, and a rotor rotatable within the stator. The housing includes a first conical surface and a first through hole, and the rotor includes a rotor support flange having a second conical surface and a second threaded hole. The second threaded hole is arranged for receiving a threaded fastener extending through the first through hole and threaded into the second threaded hole to pull the rotor support flange against the housing to secure the second conical surface against the first conical surface.

18 Claims, 4 Drawing Sheets

(56) References Cited

U.S. PATENT DOCUMENTS

2024/0048028 A1\* 2/2024 Heeke ..................... H02K 9/19
2024/0048032 A1   2/2024 Condo et al.

FOREIGN PATENT DOCUMENTS

| EP | 3738192 B1 | 11/2022 | | |
|---|---|---|---|---|
| FR | 2766026 B1 | 9/2000 | | |
| WO | WO-2023059438 A1 * | 4/2023 | ............... | B60K 1/00 |
| WO | WO-2024015410 A1 * | 1/2024 | ............... | F02N 11/04 |
| WO | WO-2024035581 A1 * | 2/2024 | ............... | H02K 5/04 |

\* cited by examiner

GENERATOR WITH INTEGRATED SHIPPING FIXTURE

TECHNICAL FIELD

The present disclosure relates generally to a generator, and more specifically to a generator with an integrated shipping fixture.

BACKGROUND

Generator shipping fixtures are known. One example is shown and described in commonly-assigned United States Patent Publication No. 2024/0048032 titled GENERATOR ROTOR CENTERING JIG to Condo et al., hereby incorporated by reference as if set forth fully herein.

SUMMARY

Example embodiments broadly comprise a generator module including a housing arranged for fixing to a combustion engine, a stator fixed in the housing, and a rotor rotatable within the stator. The housing includes a first conical surface and a first through hole, and the rotor includes a rotor support flange having a second conical surface and a second threaded hole. The second threaded hole is arranged for receiving a threaded fastener extending through the first through hole and threaded into the second threaded hole to pull the rotor support flange against the housing to secure the second conical surface against the first conical surface.

In some example embodiments, the generator module also includes a drive flange arranged for driving connection to a crankshaft of the combustion engine, and the rotor also includes a drive hub secured to the drive flange by fasteners. In an example embodiment, the threaded fastener is installed in the second threaded hole in a first axial direction and the fasteners securing the drive hub to the drive flange are installed in a second axial direction, opposite the first axial direction. In an example embodiment, the drive hub includes a pilot for positioning the drive hub in the crankshaft.

In some example embodiments, the generator module also includes a bearing. The housing also includes a pilot surface and the bearing is disposed on the pilot surface. In an example embodiment, the rotor support flange includes a cylindrical surface and the bearing is disposed within the cylindrical surface. In an example embodiment, the bearing includes an inner race, an outer race, and a plurality of rolling elements installed therebetween. The inner race is installed on the pilot surface and the rolling elements are axially slidable on the inner race.

In an example embodiment, the rotor support flange is sealed to the housing. In an example embodiment, the first conical surface has a first notch aligned with the first through hole and the second conical surface has a second notch aligned with the second threaded hole. In an example embodiment, a first diameter of the first through hole is larger than a second diameter of the second threaded hole.

In some example embodiments, the threaded fastener is a bolt. In some example embodiments, the first through hole is a first threaded hole and, after the generator module is assembled to the combustion engine, the bolt is removed and a sealing plug is threaded into the first threaded hole. In an example embodiment, the sealing plug has an o-ring for sealing to the housing.

In some example embodiments, the generator module includes the threaded fastener. The threaded fastener includes a first threaded portion extending through the first through hole, a second threaded portion arranged for threading into the second threaded hole, and a ring portion separating the first threaded portion from the second threaded portion. In an example embodiment, the first threaded portion has a first diameter, the second threaded portion has a second diameter, and the ring portion has a ring diameter greater than the first diameter or the second diameter.

In an example embodiment, the threaded fastener also includes an internal hex portion for receiving a tool to rotate the threaded fastener. In an example embodiment, the generator module also includes a nut installed on the first threaded portion for securing the threaded fastener in the first through hole. In an example embodiment, the threaded fastener also includes an o-ring for sealing the ring portion to the housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
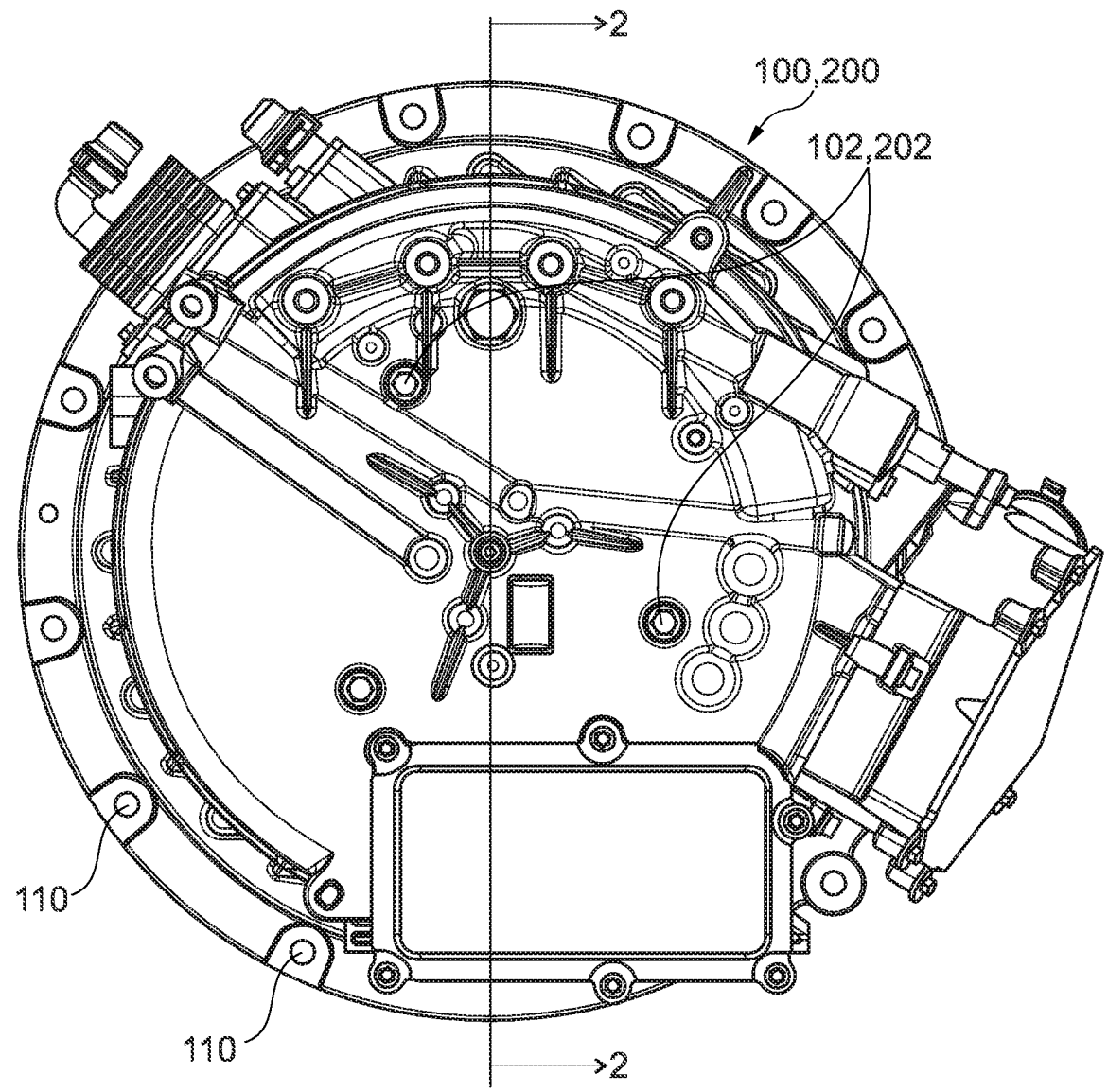
FIG. 1 illustrates an end view of a generator module according to an example embodiment.
Figure 3:
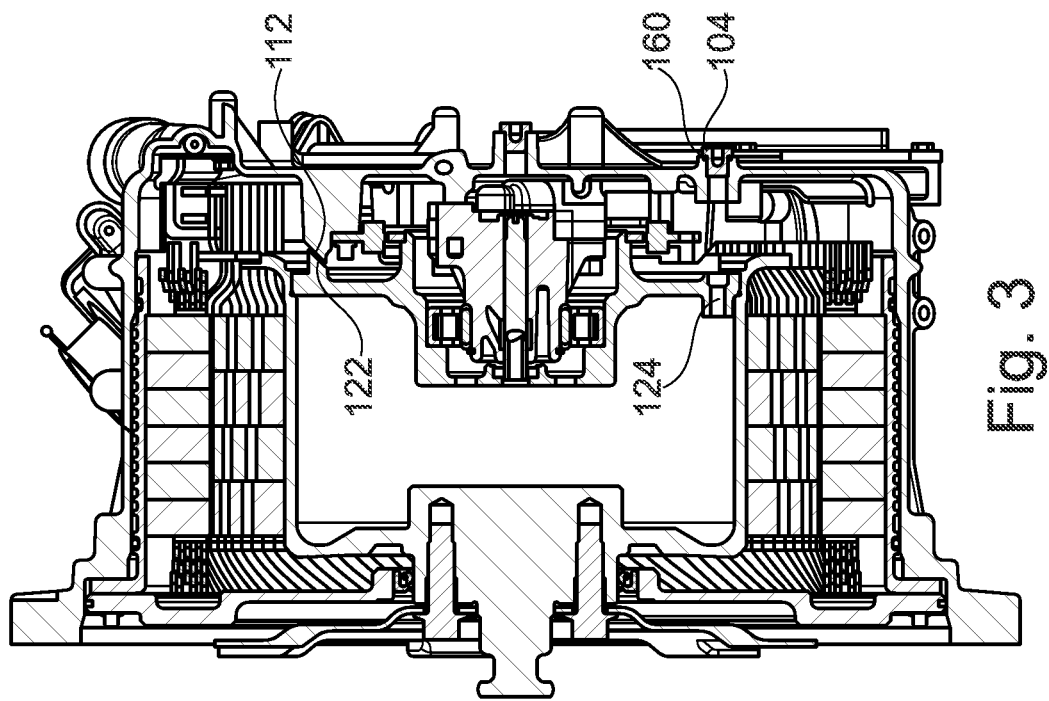
FIG. 3 illustrates a cross-sectional view taken generally along line 2-2 in FIG. 1 showing a sealing plug installed in an operating position.
Figure 2:
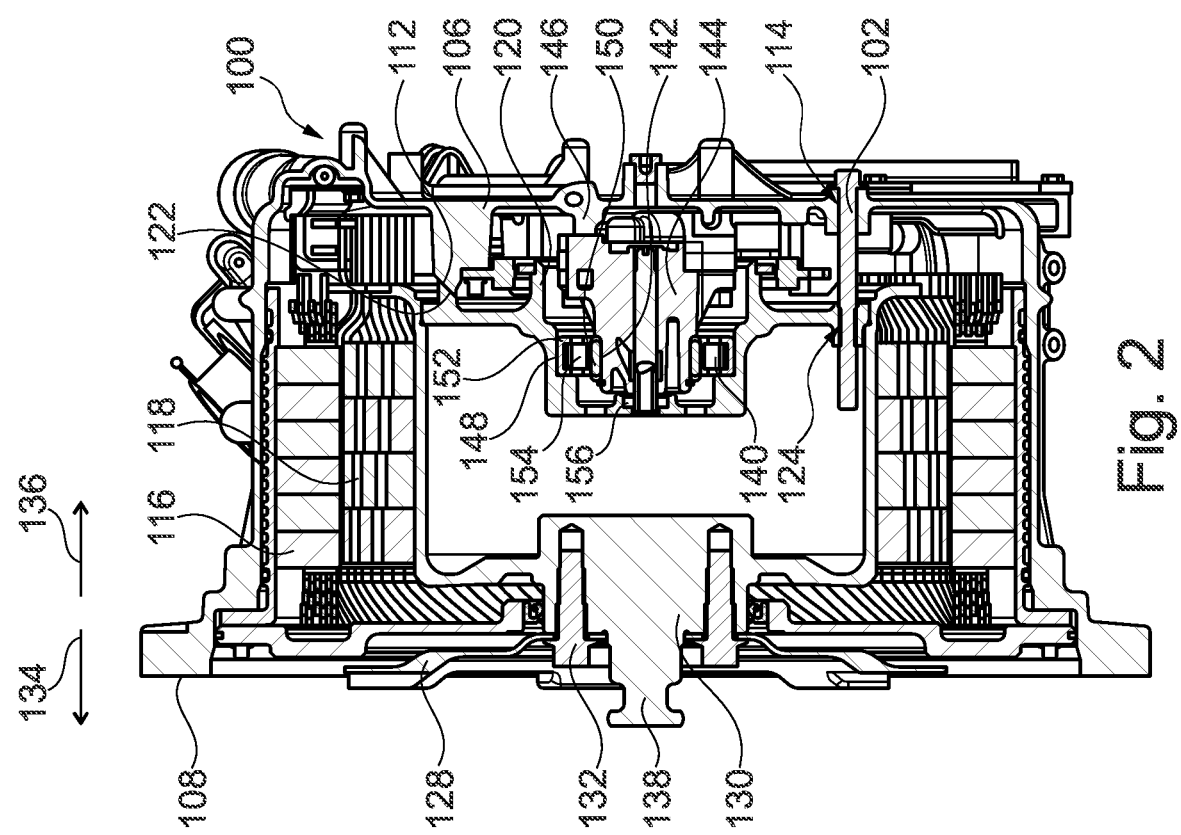
FIG. 2 illustrates a cross-sectional view taken generally along line 2-2 in FIG. 1 showing a threaded fastener installed in a transport position.

The following description is made with reference to FIGS. 1-3. FIG. 1 illustrates an end view of generator module 100 according to an example embodiment. FIG. 2 illustrates a cross-sectional view taken generally along line 2-2 in FIG. 1 showing an installed threaded fastener 102. FIG. 3 illustrates a cross-sectional view taken generally along line 2-2 in FIG. 1 showing an installed sealing plug 104. Generator module 100 includes housing 106 arranged for fixing to a combustion engine (not shown). That is, the housing includes mounting face 108 with mounting holes 110 that align with mounting holes in an engine block (not shown) of the combustion engine for receiving bolts to secure the two components together in a known manner. Further components of the generator module are also secured to other components of the combustion engine as described in more detail below.

Housing 106 includes conical surface 112 and through hole 114. Module 100 also includes stator 116 fixed in the housing, and rotor 118 rotatable within the stator. The stator and rotor operate together to generate electric power in a known manner when the rotor is rotated within the stator by the combustion engine. Rotor 118 includes rotor support flange 120 with conical surface 122 and threaded hole 124 arranged for receiving a threaded fastener (e.g., threaded fastener 102). As shown in FIG. 2, for example, the threaded fastener extends through through hole 114 and is threaded into threaded hole 124 to pull the rotor support flange against the housing to secure conical surface 122 against conical surface 112. In other words, as fastener 102 is threaded into the rotor support flange, the flange is pulled to the right in FIG. 2 so that the conical surfaces contact one another. By securing the two components together, possible damage to the stator, rotor, and/or bearing is limited during transport of the generator module before installation with the combustion engine. That is, when the conical surface are held tightly together by the threaded fastener, the module is arranged in a transport position.

Generator module 100 also includes drive flange 128 arranged for driving connection to a crankshaft of the internal combustion engine. Flange 128 may be fixed to another component bolted to the crankshaft (not shown) at a radially outer portion of the flange, for example. Rotor 118 also includes drive hub 130 secured to the drive flange by fasteners 132. In other words, power from the crankshaft is transmitted through the drive flange to the rotor flange to rotate the rotor and generate electricity as described above. Electricity generated by the generator module may be used to charge a vehicle battery, power an electric motor to propel the vehicle, or operate other devices plugged into the vehicle (e.g., power tools, welder, recreational vehicle lights and/or appliances, etc.)

As shown in FIG. 2, for example, threaded fastener 102 is installed in threaded hole 124 in axial direction 134, and fasteners 132 securing the drive hub to the drive flange are installed in axial direction 136, opposite axial direction 134. Drive hub 130 includes pilot 138 for positioning the drive hub in the crankshaft. Pilot 138 may be integrally formed from a single piece of material with the drive hub, or may be a separate component affixed to the drive hub by press-fitting, welding, adhesives, etc. The pilot is arranged to radially center the rotor relative to the crankshaft so that, when the module is bolted to the combustion engine, the rotor and stator are radially centered by the engine block and the crankshaft, respectively, which are internally centered relative to one another in the combustion engine.

Generator module 100 also includes bearing 140. Housing 106 includes pilot surface 142 and the bearing is disposed on the pilot surface. Pilot surface 142 may be integrally formed with the housing from a same piece of material or, as shown in FIGS. 2 and 3, for example, may be part of a separate component (e.g., oil pump 144) affixed to wall portion 146 of the housing. Rotor support flange 120 includes cylindrical surface 148 and bearing 140 is disposed within the cylindrical surface. Bearing 140 may engage with one or both of surfaces 142 and 144 via a press-fit or a slip fit, for example. Bearing 140 includes inner race 150, outer race 152, and rolling elements 154 installed therebetween. In the embodiment shown, rolling elements 154 are cylindrical rollers although other embodiments may have different rolling elements (e.g., balls). The inner race is installed on the pilot surface and the rolling elements are axially slidable on the inner race. That is, in order to tighten the rotor support flange against the housing when fasteners 102 are tightened as described above, the rolling elements are slidable along the inner race from the traveling position shown in FIG. 2, to the normally operating position shown in FIG. 3, for example. Rotor support flange 120 is sealed to housing 106 (e.g., at oil pump 144) via sealing ring 156, for example.

As best shown in FIG. 3, conical surface 112 includes a notch aligned with through hole 114 and conical surface 122 includes a notch aligned with threaded hole 124. That is, conical surfaces 112 and 122 do not form a complete ring, but have a clearance area for threaded fastener 102 to pass through. Other embodiments (not shown) may include full conical rings with threaded holes arranged radially inside or outside of the rings, for example. A diameter of through hole 114 is larger than a diameter of threaded hole 124, permitting the threaded fastener to extend through hole 114 without being threaded. That is, to speed assembly and disassembly of the threaded fastener with threaded hole 124, the fastener may be quickly pushed through until it engages with threaded hole 124. Other embodiments (e.g., using threaded fastener 202 described below, may have a same diameter for holes 114 and 124.

In the embodiment shown in FIG. 2, threaded fastener 102 is a bolt. Through hole 114 is a threaded hole and, after the generator module is assembled to the combustion engine, the bolt is removed and sealing plug 104 (ref. FIG. 3) is threaded into the threaded hole. Sealing plug 104 includes o-ring 160 for sealing to the housing. That is, once the housing is bolted to the engine block and the rotor is assembled with the crankshaft, the rotor is positioned within the stator as described above. Therefore, the bolt can be removed and replaced with a sealing plug to keep lubricating and cooling oil inside the housing from leaking out through hole 114.

Figure 4:
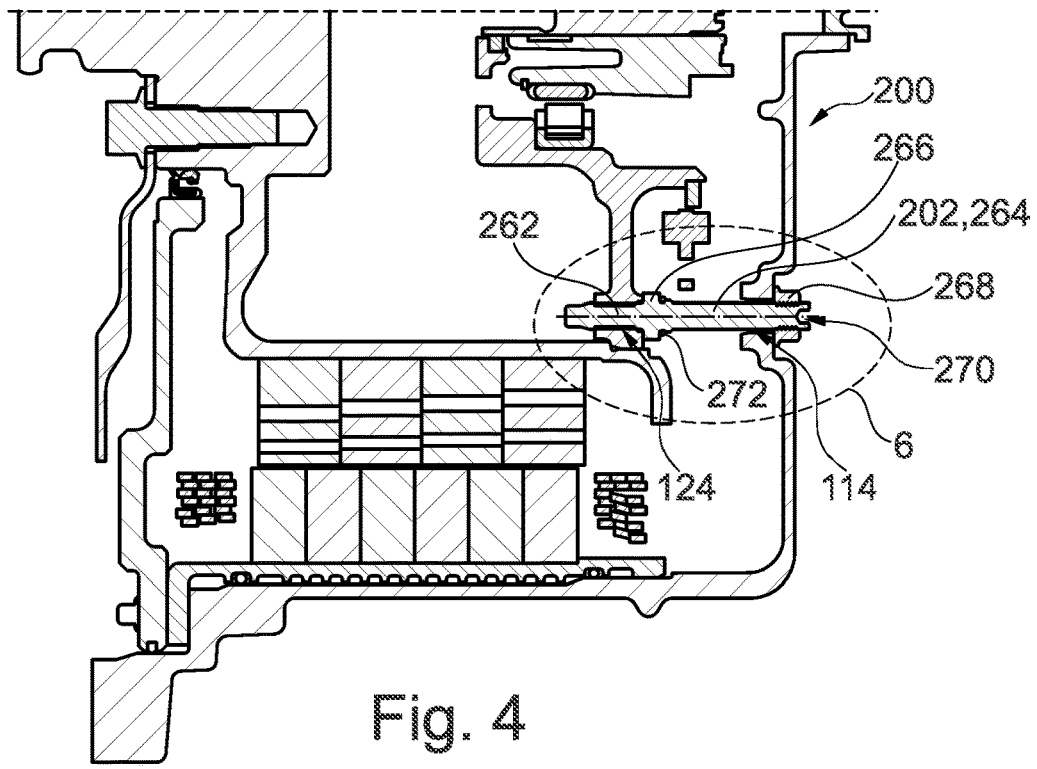
FIG. 4 illustrates a cross-sectional view taken generally along line 2-2 in FIG. 1 showing a threaded fastener installed in a transport position.
Figure 5:
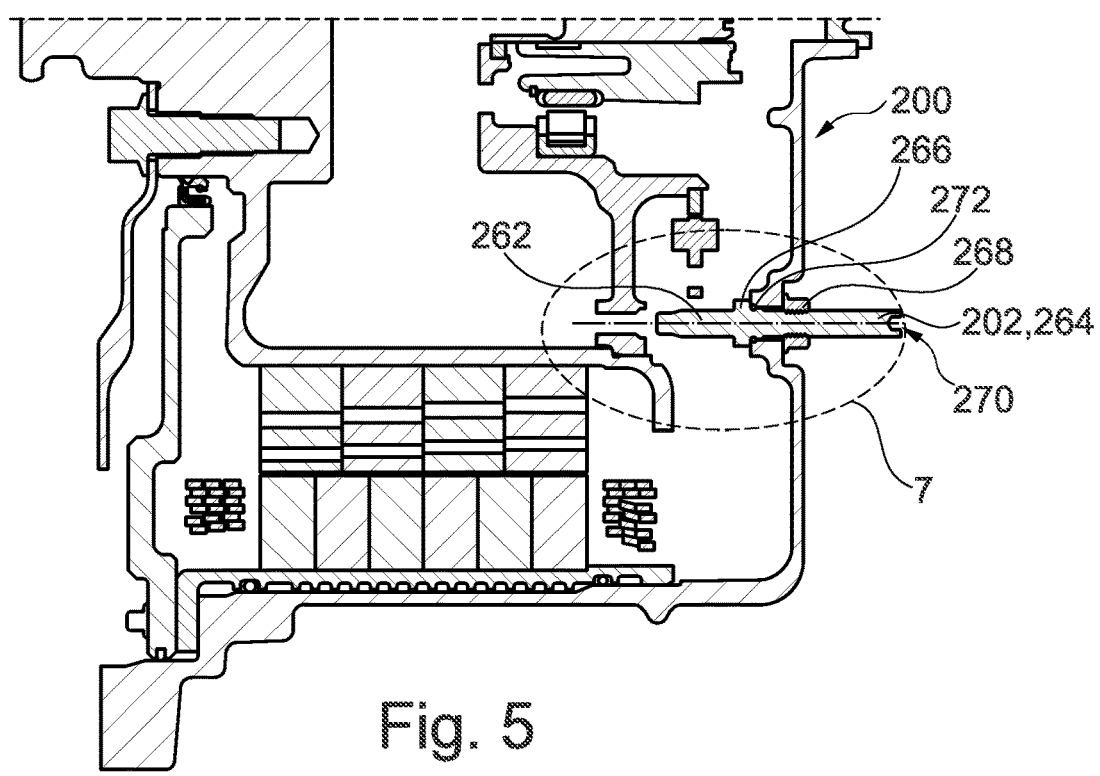
FIG. 5 illustrates a cross-sectional view taken generally along line 2-2 in FIG. 1 showing a threaded fastener installed in an operating position.
Figure 6:
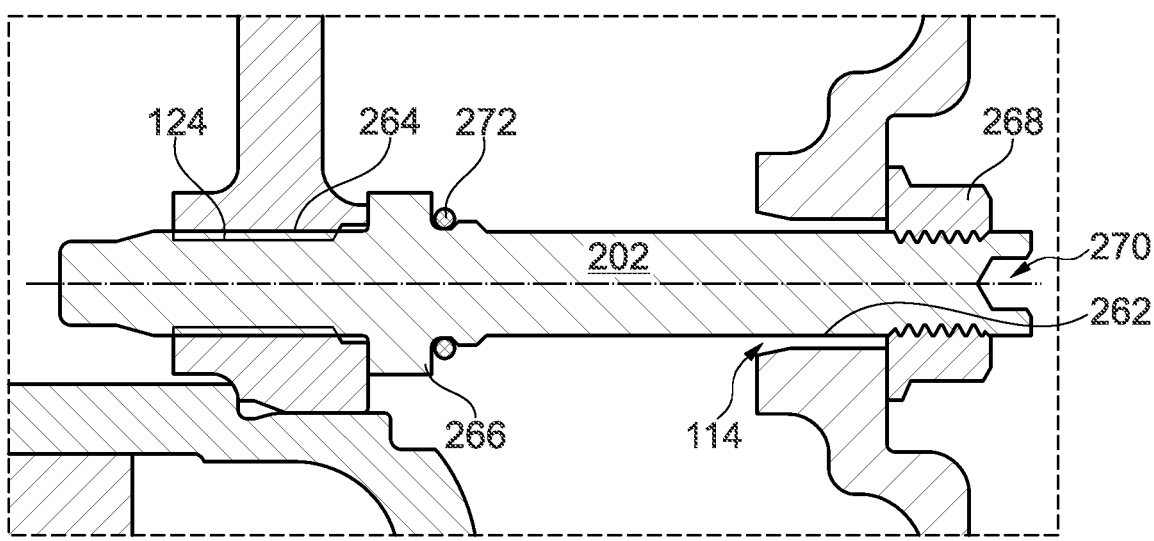
FIG. 6 illustrates a detail view of encircled region 6 in FIG. 4.
Figure 7:
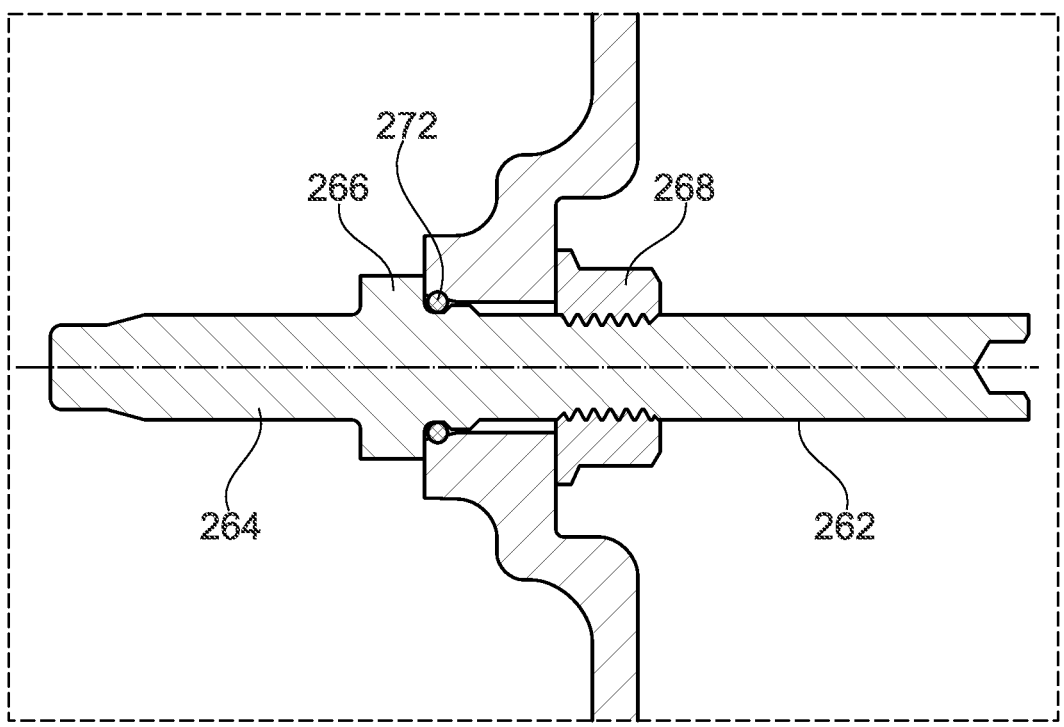
FIG. 7 illustrates a detail view of encircled region 7 in FIG. 5.

The following description is made with reference to FIGS. 4-6. FIG. 4 illustrates a cross-sectional view taken generally along line 2-2 in FIG. 1 showing a threaded fastener installed in a transport position. FIG. 5 illustrates a cross-sectional view taken generally along line 2-2 in FIG. 1 showing a threaded fastener installed in an operating position. FIG. 6 illustrates a detail view of encircled region 6 in FIG. 4. FIG. 7 illustrates a detail view of encircled region 7 in FIG. 5.

Generator module 200 includes threaded fastener 202. Threaded fastener 202 includes threaded portion 262 extending through through hole 114, threaded portion 264 threaded into threaded hole 124, and ring portion 266 separating threaded portion 262 from threaded portion 264. As best shown in FIGS. 6 and 7, for example, ring portion 266 includes a ring diameter greater than a diameter of threaded portion 262 and threaded portion 264. Generator module 200 also includes nut 268 installed on threaded portion 262 for securing the threaded fastener in through hole 114. Threaded fastener 202 also includes internal hex portion 270 for receiving a tool to rotate the threaded fastener, and o-ring 272 for sealing the ring portion to the housing (ref. FIG. 7).

During assembly of generator module 200, the threaded fastener may be initially installed in rotor support flange 120 and slipped through through hole 114. To secure the module in a transport position, nut 268 is tightened against housing 106, pulling the two conical surfaces together, similar to tightening of fastener 102 described above with reference to generator module 100. Once installed with the combustion engine, nut 268 can be loosened or removed and fastener 202 may be unthreaded from threaded hole 124 using internal hex portion 270. Nut 268 is reinstalled, if necessary, and tightened against the housing to secure the threaded fastener in an operating position, with o-ring 272 secured against the housing to prevent fluid leakage, similar to sealing plug 104 described above. If the module must be removed from the combustion engine for service, for example, nut 268 is loosened and/or removed, holes 114 and 124 are rotationally aligned, threaded portion 262 is threaded into threaded hole 124 using hex portion 270, and the nut is tightened to secure the module in the transport position.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Generator module
102 Threaded fastener
104 Sealing plug
106 Housing
108 Mounting face (housing)
110 Mounting holes (housing)
112 Conical surface (first, housing)
114 Through hole (first, housing)
116 Stator
118 Rotor
120 Rotor support flange
122 Conical surface (second, rotor support flange)
124 Threaded hole (second, rotor support flange)
128 Drive flange
130 Drive hub
132 Fasteners (drive flange to drive hub)
134 Axial direction (first)
136 Axial direction (second)
138 Pilot
140 Bearing
142 Pilot surface (housing)
144 Oil pump (housing)
146 Wall portion (housing)
148 Cylindrical surface (rotor support flange)
150 Inner race (bearing)
152 Outer race (bearing)
154 Rolling elements (bearing)
156 Sealing ring
160 O-ring (sealing plug)
200 Generator module
202 Threaded fastener
262 Threaded portion (first, threaded fastener)
264 Threaded portion (second, threaded fastener)
266 Ring portion (threaded fastener)
268 Nut
270 Internal hex portion (threaded fastener)
272 O-ring (threaded fastener)

What is claimed is:

1. A generator module, comprising:
   a housing arranged for fixing to a combustion engine, the housing comprising:
      a first conical surface; and
      a first through hole;
   a stator fixed in the housing;
   a rotor rotatable within the stator, the rotor comprising a rotor support flange having:
      a second conical surface; and
      a second threaded hole arranged for receiving a threaded fastener extending through the first through hole and threaded into the second threaded hole to pull the rotor support flange against the housing to secure the second conical surface against the first conical surface.

2. The generator module of claim 1 further comprising a drive flange arranged for driving connection to a crankshaft of the combustion engine, the rotor further comprising a drive hub secured to the drive flange by fasteners.

3. The generator module of claim 2 wherein:
   the threaded fastener is installed in the second threaded hole in a first axial direction; and
   the fasteners securing the drive hub to the drive flange are installed in a second axial direction, opposite the first axial direction.

4. The generator module of claim 2 wherein the drive hub comprises a pilot for positioning the drive hub in the crankshaft.

5. The generator module of claim 1 further comprising a bearing, wherein:
   the housing further comprises a pilot surface; and
   the bearing is disposed on the pilot surface.

6. The generator module of claim 5 wherein:
   the rotor support flange comprises a cylindrical surface; and
   the bearing is disposed within the cylindrical surface.

7. The generator module of claim 5 wherein:
the bearing comprises an inner race, an outer race, and a plurality of rolling elements installed therebetween;
the inner race is installed on the pilot surface; and
the rolling elements are axially slidable on the inner race.

8. The generator module of claim 1 wherein the rotor support flange is sealed to the housing.

9. The generator module of claim 1 wherein:
the first conical surface has a first notch aligned with the first through hole; and
the second conical surface has a second notch aligned with the second threaded hole.

10. The generator module of claim 1 wherein a first diameter of the first through hole is larger than a second diameter of the second threaded hole.

11. The generator module of claim 1 wherein the threaded fastener is a bolt.

12. The generator module of claim 11 wherein:
the first through hole is a first threaded hole; and
after the generator module is assembled to the combustion engine, the bolt is removed and a sealing plug is threaded into the first threaded hole.

13. The generator module of claim 12 wherein the sealing plug comprises an o-ring for sealing to the housing.

14. The generator module of claim 1 further comprising the threaded fastener, wherein the threaded fastener comprises:
a first threaded portion extending through the first through hole;
a second threaded portion arranged for threading into the second threaded hole; and
a ring portion separating the first threaded portion from the second threaded portion.

15. The generator module of claim 14 wherein:
the first threaded portion has a first diameter;
the second threaded portion has a second diameter; and
the ring portion comprises a ring diameter greater than the first diameter or the second diameter.

16. The generator module of claim 14 wherein the threaded fastener further comprises an internal hex portion for receiving a tool to rotate the threaded fastener.

17. The generator module of claim 14 further comprising a nut installed on the first threaded portion for securing the threaded fastener in the first through hole.

18. The generator module of claim 14 wherein the threaded fastener further comprises an o-ring for sealing the ring portion to the housing.

* * * * *